United States Patent
Xu

(10) Patent No.: US 11,375,407 B2
(45) Date of Patent: Jun. 28, 2022

(54) METHOD AND APPARATUS FOR NEGOTIATION OF USER EQUIPMENT POLICY DELIVERY

(71) Applicant: GUANGDONG OPPO MOBILE TELECOMMUNICATIONS CORP., LTD., Guangdong (CN)

(72) Inventor: Yang Xu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/880,470

(22) Filed: May 21, 2020

(65) Prior Publication Data

US 2020/0280888 A1    Sep. 3, 2020

Related U.S. Application Data

(63) Continuation of application No. PCT/CN2018/117267, filed on Nov. 23, 2018.
(Continued)

(51) Int. Cl.
*H04W 28/18*    (2009.01)
*H04W 4/40*    (2018.01)
(Continued)

(52) U.S. Cl.
CPC ......... *H04W 28/18* (2013.01); *H04L 41/0893* (2013.01); *H04L 63/20* (2013.01); *H04W 4/40* (2018.02); *H04W 8/02* (2013.01); *H04W 8/22* (2013.01); *H04W 12/37* (2021.01); *H04W 48/08* (2013.01); *H04W 60/04* (2013.01)

(58) Field of Classification Search
None
See application file for complete search history.

(56) References Cited

U.S. PATENT DOCUMENTS

2017/0288886 A1\* 10/2017 Atari .................. H04L 65/1063
2018/0367322 A1    12/2018 Watanabe et al.
(Continued)

FOREIGN PATENT DOCUMENTS

| CN | 103299700 A | 9/2013 |
| CN | 103778364 A | 5/2014 |

(Continued)

OTHER PUBLICATIONS

SA WG2 Meeting #124; Nov. 27, 2017-Dec. 1, 2017, Reno, Nevada; S2-178478.
(Continued)

*Primary Examiner* — Anh Vu H Ly
(74) *Attorney, Agent, or Firm* — Young Basile Hanlon & MacFarlane, P.C.

(57) ABSTRACT

A method and an apparatus for negotiation of user equipment (UE) policy delivery are provided. A method for negotiation of UE policy delivery of a user equipment includes generating a first indicator being associated with a capability of the UE and reporting, to a network node, the first indicator being associated with the capability of the UE, wherein the capability of the UE describes support for the UE triggering a UE policy configuration, and/or a UE assistant information for a UE policy distribution.

15 Claims, 6 Drawing Sheets

400

402  Generating a first indicator being associated with a capability of a user equipment (UE)

404  Reporting, to a network node, the first indicator being associated with support for the UE triggering a UE policy configuration, and/or a UE assistant information for a UE policy distribution

Related U.S. Application Data

(60) Provisional application No. 62/590,849, filed on Nov. 27, 2017.

(51) Int. Cl.

| | |
|---|---|
| *H04L 41/0893* | (2022.01) |
| *H04L 9/40* | (2022.01) |
| *H04W 8/02* | (2009.01) |
| *H04W 8/22* | (2009.01) |
| *H04W 48/08* | (2009.01) |
| *H04W 60/04* | (2009.01) |
| *H04W 12/37* | (2021.01) |

(56) References Cited

U.S. PATENT DOCUMENTS

| | | | |
|---|---|---|---|
| 2019/0029065 A1* | 1/2019 | Park | H04W 4/16 |
| 2019/0116520 A1* | 4/2019 | Chaponniere | H04W 4/20 |
| 2019/0268835 A1 | 8/2019 | Shan et al. | |

FOREIGN PATENT DOCUMENTS

| | | |
|---|---|---|
| CN | 106164859 A | 11/2016 |
| CN | 108702598 A | 10/2018 |
| EP | 3166362 A1 | 5/2017 |
| KR | 20150080564 A | 7/2015 |
| WO | 2017149615 A1 | 9/2017 |

OTHER PUBLICATIONS

Extended European Search Report for EP Application 18880745.7 dated Jul. 23, 2020.
SA WG2 Meeting #124; Nov. 27-Dec. 1, 2017, Reno, Nevada (USA); S2-178332.
SA WG2 Meeting #S2-124; Nov. 27-Dec. 1, 2017,Reno, Nevada, USA; S2-178540.
International Search Report for PCT/CN2018/117267 dated Feb. 15, 2019.
SA WG2 Meeting #124; S2-178546; Nov. 27-Dec. 1, 2017, Reno, USA.
SA WG2 Meeting #S2-124 S2-178608; Nov. 27-Dec. 1, 2017, Reno, Nevada, USA.
Australian First Office Action for Application 2018370898 dated Dec. 2, 2020.
Korean First Office Action with English Translation for KR Application 10-2020-7008020 dated Jan. 29, 2021.
Communication pursuant to Article 94(3) EPC for EP Application 18880745.7 dated Feb. 24, 2021. (5 pages).
SA WG2 Meeting #124; S2-178902; Allowing UE to provide information to assist the PCF for UE Policies delivery; Nov. 27-Dec. 1, 2017, Reno, Nevada, USA; 1 page.
SA WG2 Meeting #S2-124; S2-178510; Nov. 27-Dec. 1, 2017, Reno, Nevada, USA; Distribution of UE policies; pp. 1-2.
SA WG2 Meeting #122bis; S2-175692; Aug. 21-25, 2017, Sophia Antipolis, France; 3 GPP PC5 RAT selection solution for key issue#2; pp. 1-2.
CN Office Action with English Translation for CN Application No. 202010621544.5 dated Jun. 16, 2021.
JP Office Action with English Translation for JP Application No. 2020-519418 dated May 3, 2021.
Chinese Second Office Action with English Translation for CN Application 202010621544.5 dated Aug. 24, 2021. (17 pages).
Communication pursuant to Article 94(3) EPC for EP Application 18880745.7 dated Aug. 26, 2021. (4 pages).
Indian Examination Report for IN Application 202017021612 dated Jul. 14, 2021. (6 pages).
Korean Office Action with English Translation for KR Application 1020207008020 dated Jul. 26, 2021. (9 pages).
Chinese Third Office Action with English Translation for CN Application 202010621544.5 dated Nov. 23, 2021. (10 pages).

* cited by examiner

METHOD AND APPARATUS FOR NEGOTIATION OF USER EQUIPMENT POLICY DELIVERY

CROSS-REFERENCE TO RELATED APPLICATION(S)

The present application is a continuation application of International Application No. PCT/CN2018/117267, filed on Nov. 23, 2018, which claims priority to U.S. provisional application No. 62/590,849, filed on Nov. 27, 2017, the disclosures of both of which are hereby incorporated by reference in their entireties.

TECHNICAL FIELD

The present disclosure relates to the field of communication systems, and more particularly, to a method and an apparatus for negotiation of user equipment (UE) policy delivery.

BACKGROUND

Current mechanisms tend to lack negotiation for UE policy delivery between a UE and a network, which may incur a duplicated UE policy distribution, and thus too much related signaling occurs.

SUMMARY

An object of the present disclosure is to propose a method and an apparatus for negotiation of UE policy delivery between a UE and a network.

In a first aspect of the present disclosure, a UE for negotiation of UE policy delivery includes a memory, a transceiver, and a processor coupled to the memory and the transceiver. The processor is configured to generate a first indicator being associated with a capability of the UE and control the transceiver to report, to a network node, the first indicator being associated with support for the UE triggering a UE policy configuration, and/or UE assistant information for a UE policy distribution.

In a second aspect of the present disclosure, a method for negotiation of UE policy delivery of a UE includes generating a first indicator being associated with a capability of the UE and reporting, to a network node, the first indicator being associated with support for the UE triggering a UE policy configuration, and/or UE assistant information for a UE policy distribution.

In a third aspect of the present disclosure, a network node for negotiation of UE policy delivery includes a memory, a transceiver, and a processor coupled to the memory and the transceiver. The processor is configured to control the transceiver to receive a first indicator being associated with a capability of a UE and support for the UE triggering a UE policy configuration, and/or UE assistant information for a UE policy distribution from the UE.

In a forth aspect of the present disclosure, a method for negotiation of UE policy delivery of a network node includes receiving a first indicator being associated with a capability of a UE and support for the UE triggering a UE policy configuration, and/or UE assistant information for a UE policy distribution from the UE.

In a fifth aspect of the present disclosure, a UE for negotiation of UE policy delivery includes a memory, a transceiver, and a processor coupled to the memory and the transceiver. The processor is configured to trigger a UE policy configuration request according to system information when a network node allows the UE to trigger the UE policy configuration request, and/or control the transceiver to receive, the system information including a UE policy identifier and/or indication (ID), a policy rule ID, and/or an application ID from the network node.

In a sixth aspect of the present disclosure, a method for negotiation of UE policy delivery of a UE includes triggering a UE policy configuration request according to system information when a network node allows the UE to trigger the UE policy configuration request, and/or receiving, the system information including a UE policy identifier and/or indication (ID), a policy rule ID, and/or an application ID from the network node.

In a seventh aspect of the present disclosure, a network node for negotiation of UE policy delivery includes a memory, a transceiver, and a processor coupled to the memory and the transceiver. The processor is configured to allow a UE to trigger a UE policy configuration request according to system information, and/or control the transceiver to transmit, to the UE, the system information including a UE policy identifier and/or indication (ID), a policy rule ID, and/or an application ID.

In an eighth aspect of the present disclosure, a method for negotiation of UE policy delivery of a network node includes allowing a UE to trigger a UE policy configuration request according to system information, and/or transmitting, to the UE, the system information including a UE policy identifier and/or indication (ID), a policy rule ID, and/or an application ID.

In a ninth aspect of the present disclosure, a non-transitory machine-readable storage medium has stored thereon instructions that, when executed by a computer, cause the computer to perform the above method.

In a tenth aspect of the present disclosure, a terminal device includes a processor and a memory configured to store a computer program. The processor is configured to execute the computer program stored in the memory to perform the above method.

In an eleventh aspect of the present disclosure, a network node includes a processor and a memory configured to store a computer program. The processor is configured to execute the computer program stored in the memory to perform the above method.

BRIEF DESCRIPTION OF DRAWINGS

In order to more clearly illustrate the implementations of the present disclosure or related art, the following figures which will be described in the implementations are briefly introduced. It is obvious that the drawings are merely some implementations of the present disclosure, a person having ordinary skill in this field can obtain other figures according to these figures without paying the premise.

DETAILED DESCRIPTION

Implementations of the present disclosure are described in detail with the technical matters, structural features, achieved objects, and effects with reference to the accompanying drawings as follows. Specifically, the terminologies in the implementations of the present disclosure are merely for describing the purpose of the certain implementation, but not to limit the disclosure.

Figure 1:
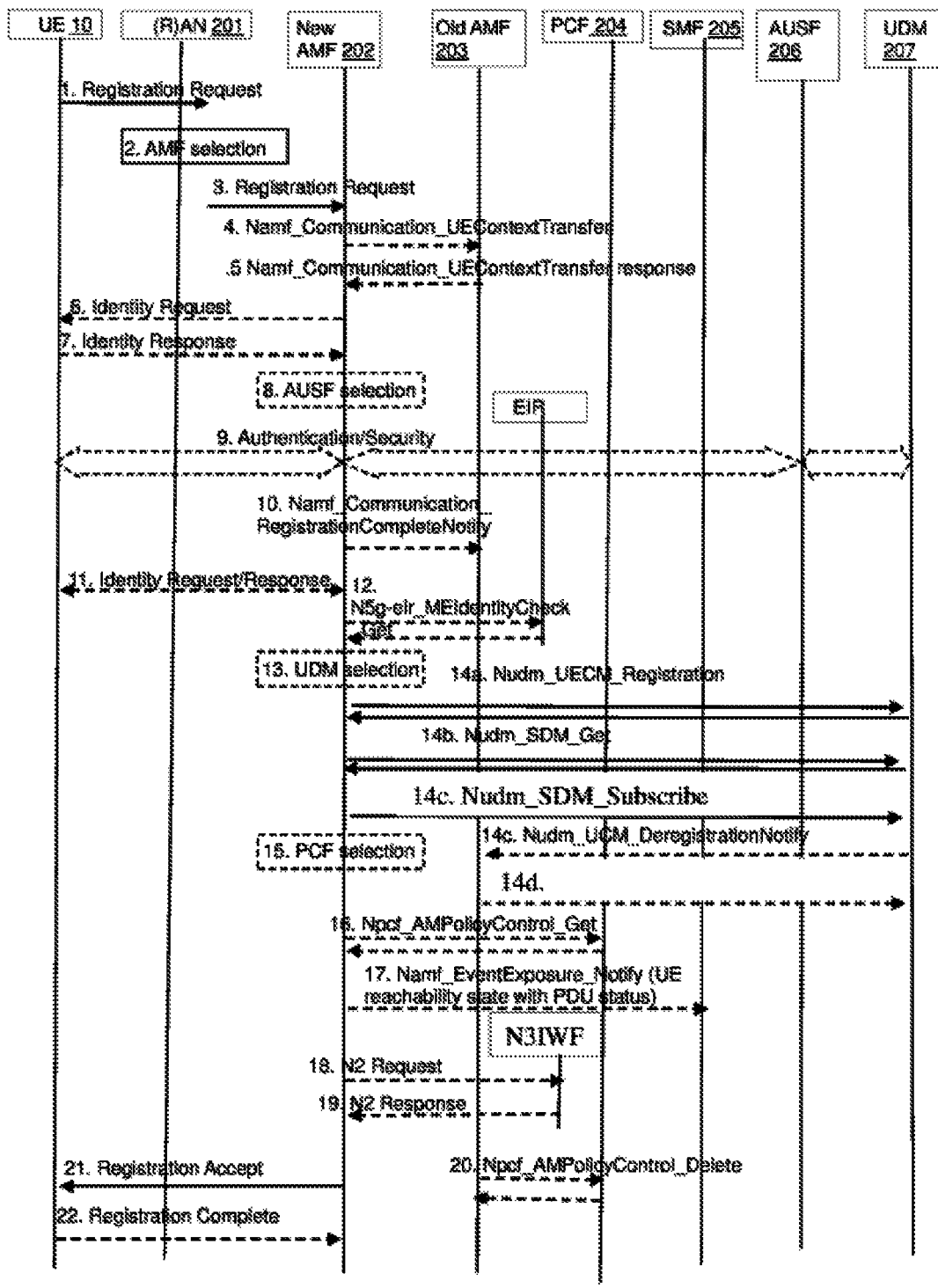
FIG. 1 is a schematic diagram of a registration procedure between a UE and a network according to an implementation of the present disclosure.

FIG. 1 illustrates that, in some implementations, in a registration procedure, a UE 10 needs to register with a network node 20, such as a (Radio) access network ((R)AN) 201, a new core access and mobility management function (AMF) 202, an old AMF 203, a policy control function (PCF) 204, a session management function (SMF) 205, an authentication server function (AUSF) 206, and a unified data management 207, to get authorized to receive services, to enable mobility tracking and to enable reachability. The registration procedure is used when the UE 10 needs to perform initial registration to a fifth generation (5G) system. Mobility registration updates upon changing to a new tracking area (TA) outside a registration area of the UE 10 in both CM_CONNECTED and CM_IDLE modes when the UE 10 performs a periodic registration update (due to a predefined time period of inactivity), and additionally when the UE 10 needs to update its capabilities or protocol parameters that are negotiated in the registration procedure. The registration procedure provides steps 1 to 13, 14a to 14d, and 15 to 22, and general registration call flow and the description thereof are in TS 23.501 clause 4.2.2.2.2.

Figure 2:
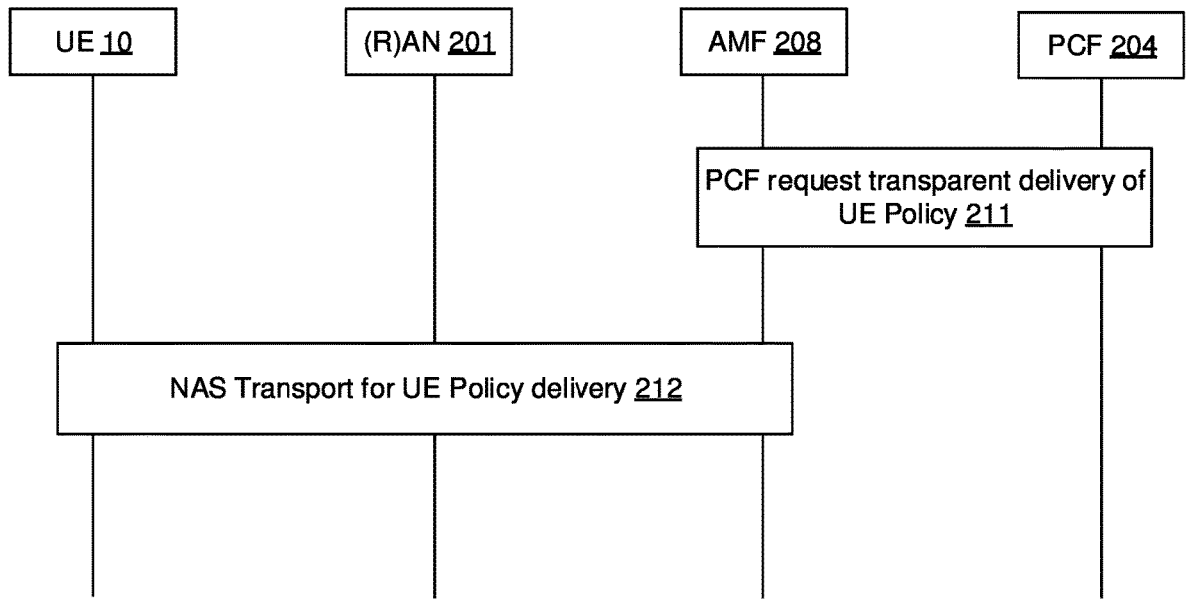
FIG. 2 is a schematic diagram of UE policy configuration procedure for transparent UE policy delivery between a UE and a network according to an implementation of the present disclosure.

FIG. 2 illustrates that, in some implementations, a procedure is initiated when a UE 10 has no policy configured, or current policies are no longer applicable, e.g. due to location or information of the policy. In some implementations, as defined in clauses 4.16.1.2 and 4.16.2.2, an AMF 208 receives UE policy information from the PCF 204 that needs to be delivered transparently to the UE 10 over a non-access stratum (NAS) message as illustrated in a block 211. The AMF 208 sends a UE policy received from the PCF 204 as a transparent container in the NAS message transport for the UE policy to the UE 10 as illustrated in a block 212. It is understood that the NAS message used for this procedure is decided by stage 3 as specified in TS 24.501.

Figure 3:
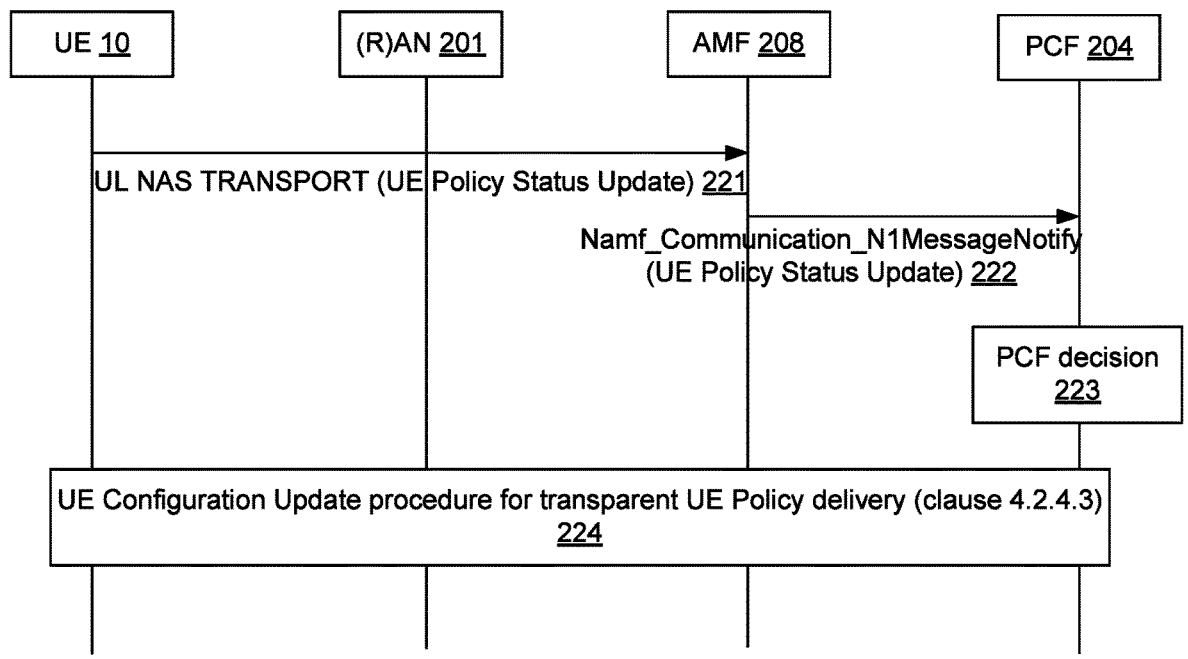
FIG. 3 is a schematic diagram of UE initiating UE configuration for UE policy delivery between a UE and a network according to an implementation of the present disclosure.

FIG. 3 illustrates that, in some implementations, at a block 221, when the UE 10 detects that there is a need to obtain updated UE policies, e.g. it has no valid policy to apply in a current location or PLMN, the UE 10 includes a UE policy status update in an uplink (UL) NAS transport message towards the AMF 208. The UE policy status update indicates information of the current UE policies at the UE 10. The UE 10 indicates in the UL NAS transport message that the message is intended for the PCF 204. It is understood that, a possible value of the UE policy status update is specified in TS 23.503. At a block 222, the AMF 208 invokes a Namf_Communication_N1MessageNotify service operation towards the PCF 204. The service operation includes the UE policy status update received at the block 221. At a block 223, the PCF 204 decides on whether new UE policy could be delivered to the UE 10 based on received UE policy update information. At a block 224, if the PCF 204 decides to update the UE policy, the PCF 204 invokes the UE configuration update procedure for transparent UE policy delivery procedure as defined in clause 4.2.4.3 to update the UE policy.

Figure 4:
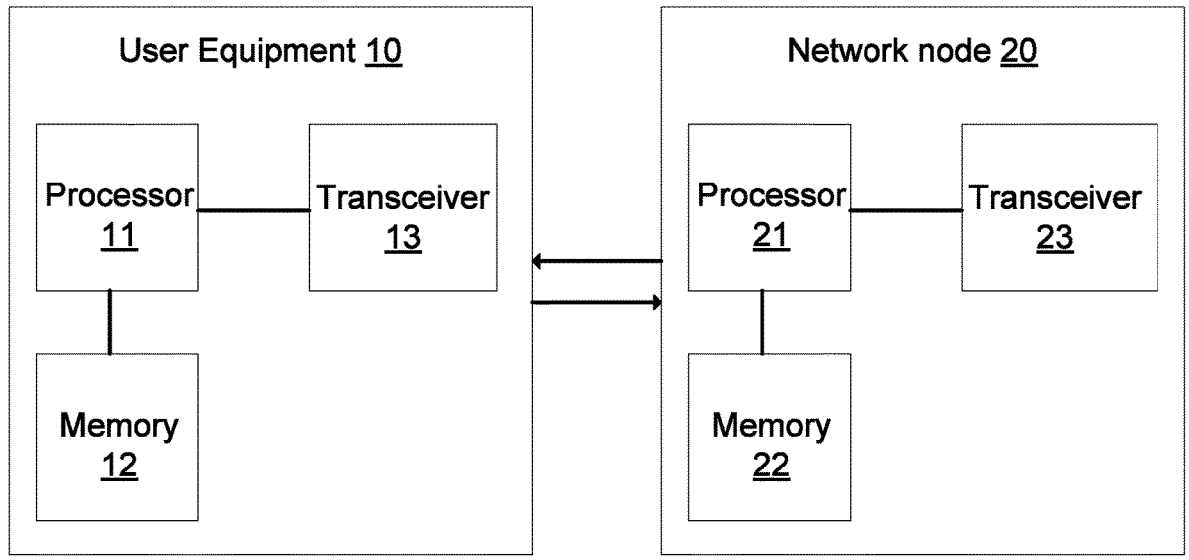
FIG. 4 is a block diagram of a UE and a network node for negotiation of UE policy delivery according to an implementation of the present disclosure.

FIG. 4 illustrates that, in some implementations, a UE 10 and a network node 20 for negotiation of UE policy delivery. The UE 10 may include a processor 11, a memory 12 and a transceiver 13. The network node 20 may include a processor 21, a memory 22 and a transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the implementations are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) new radio (NR) Release 16 and beyond. UEs are communicated with each other directly via a sidelink interface such as a PC5 interface.

In some implementations, the processor 11 is configured to generate a first indicator being associated with a capability of the UE 10 and control the transceiver 13 to report, to the network node 20, the first indicator being associated with support for the UE 10 triggering a UE policy configuration, and/or UE assistant information for a UE policy distribution.

In some implementations, the UE policy distribution is essentially that a network node performs the UE policy distribution for the UE. For example, the UE policy distribution is detailed illustrated in FIG. 2.

In some implementations, the UE policy distribution is performed according to a message of the UE assistant information. For example, the UE assistant information includes an application ID such as V2X, the PCF delivers a policy corresponding to a V2X service to the UE.

In some implementations, the processor 21 is configured to control the transceiver 23 to receive a first indicator being associated with a capability of the UE 10 and support for the UE 10 triggering a UE policy configuration, and/or UE assistant information for a UE policy distribution from the UE 10.

In some implementations, the processor 11 is configured to trigger a UE policy configuration request according to system information when the network node 20 allows the UE 10 to trigger the UE policy configuration request, and/or control the transceiver 13 to receive, the system information including a UE policy identifier and/or indication (ID), a policy rule ID, and/or an application ID from the network node. In the implementation, ID means identifier and/or indication.

In some implementations, the processor 21 is configured to allow the UE 10 to trigger a UE policy configuration request according to system information, and/or control the transceiver 23 to transmit, to the UE 10, the system information including a UE policy identifier and/or indication (ID), a policy rule ID, and/or an application ID.

Figure 5:
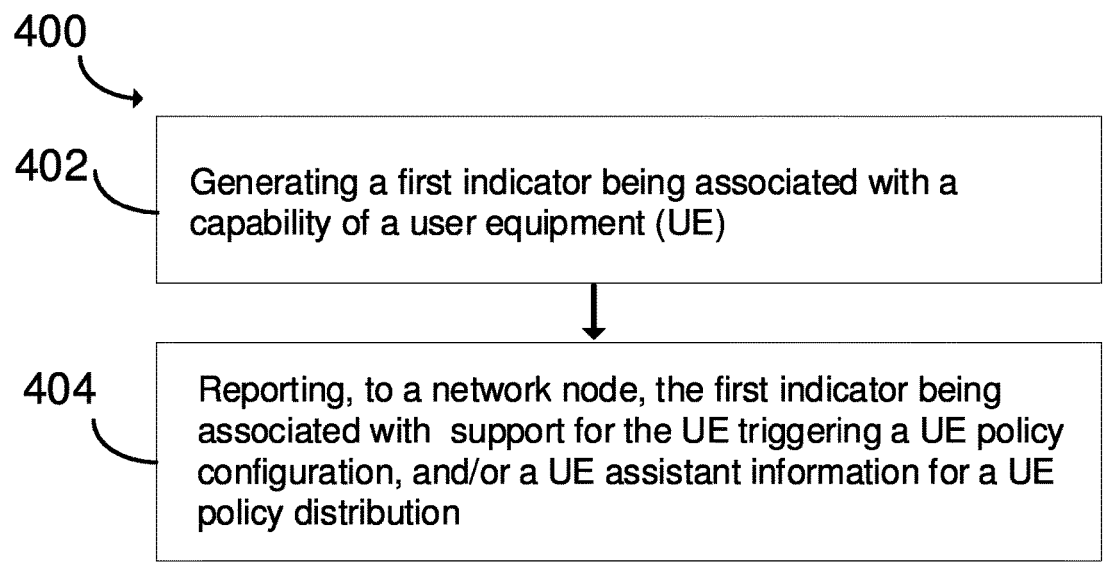
FIG. 5 is a flowchart illustrating a method for negotiation of UE policy delivery of a UE according to an implementation of the present disclosure.

FIG. 5 illustrates a method 400 for negotiation of UE policy delivery of the UE 10 according to an implementation of the present disclosure. The method 400 includes: at block 402, generating a first indicator being associated with a capability of the UE 10, and at block 404, reporting, to the network node 20, the first indicator being associated with support for the UE 10 triggering a UE policy configuration, and/or UE assistant information for a UE policy distribution.

Figure 6:
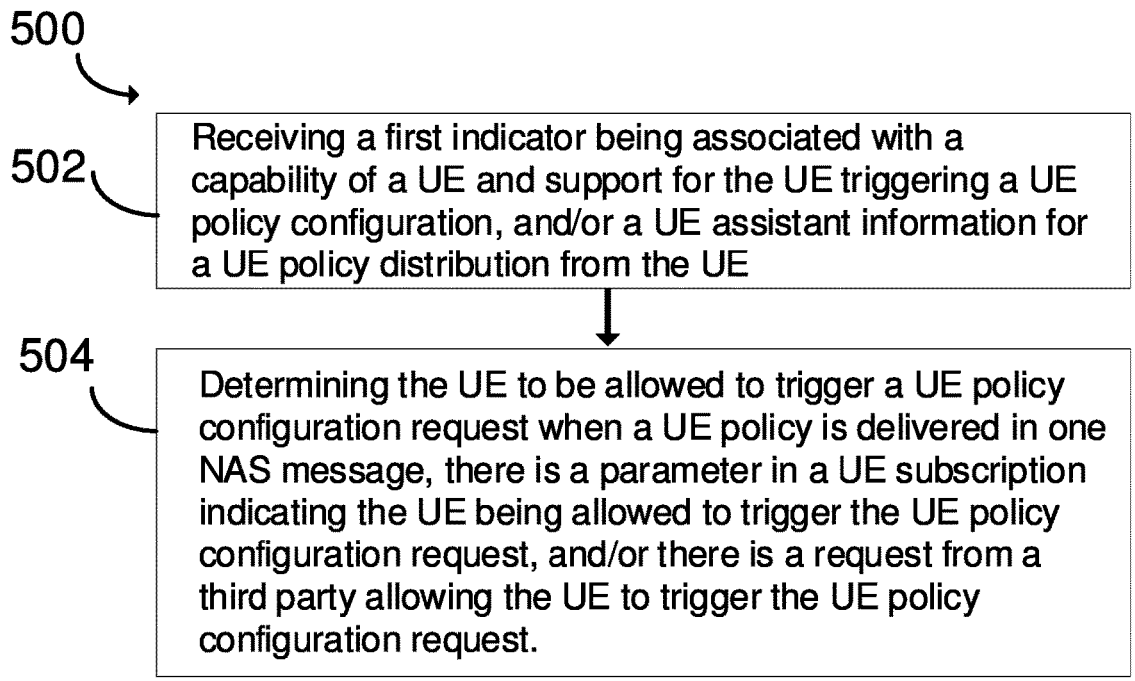
FIG. 6 is a flowchart illustrating a method for negotiation of UE policy delivery of a network node according to an implementation of the present disclosure.

FIG. 6 illustrates a method 500 for negotiation of UE policy delivery of the network node 20 according to an implementation of the present disclosure. The method 500 includes: at block 502, receiving a first indicator being associated with a capability of the UE 10 and support for the UE 10 triggering a UE policy configuration, and/or UE assistant information for a UE policy distribution from the UE 10, and at block 504, determining the UE 10 to be allowed to trigger a UE policy configuration request when a UE policy is delivered in one NAS message, there is a parameter in a UE subscription indicating the UE 10 being allowed to trigger the UE policy configuration request, and/or there is a request from a third party allowing the UE 10 to trigger the UE policy configuration request.

Figure 7:
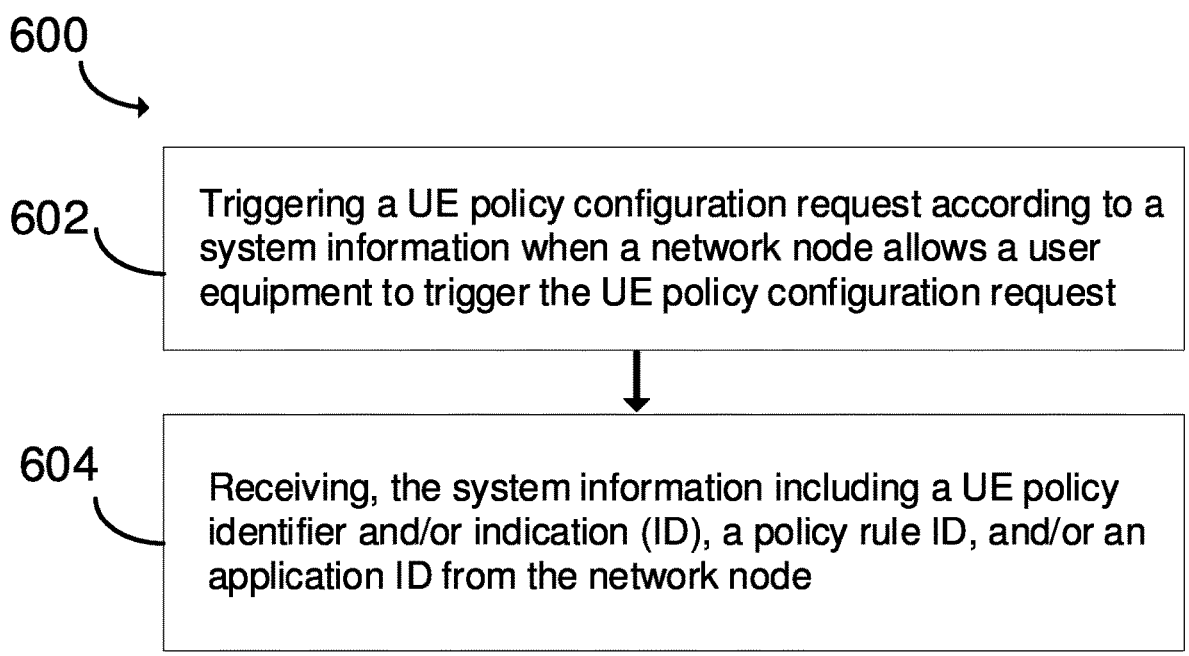
FIG. 7 is a flowchart illustrating a method for negotiation of UE policy delivery of a UE according to another implementation of the present disclosure.

FIG. 7 illustrates a method 600 for negotiation of UE policy delivery of the UE 10 according to another implementation of the present disclosure. The method 600 includes: at block 602, triggering a UE policy configuration request according to system information when the network node 20 allows the UE 10 to trigger the UE policy configuration request, and/or at block 604, receiving, the system information including a UE policy identifier and/or indication (ID), a policy rule ID, and/or an application ID from the network node 20.

Figure 8:
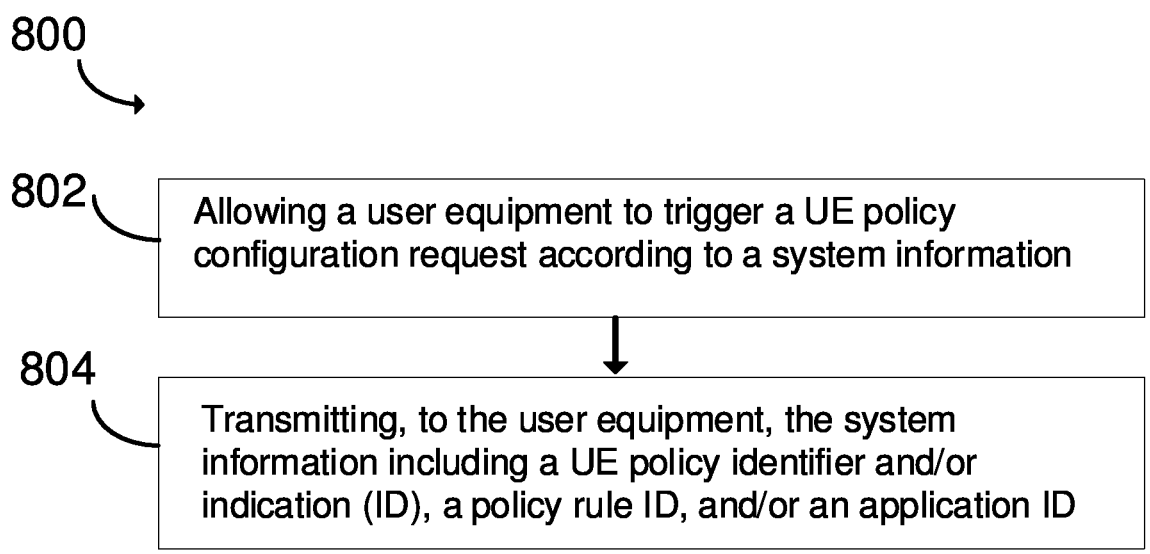
FIG. 8 is a flowchart illustrating a method for negotiation of UE policy delivery of a network node according to another implementation of the present disclosure.

FIG. 8 illustrates a method 800 for negotiation of UE policy delivery of the network node 20 according to another implementation of the present disclosure. The method 800 includes: at block 802, allowing the UE 10 to trigger a UE policy configuration request according to system information, and/or at block 804, transmitting, to the UE 10, the system information including a UE policy identifier and/or indication (ID), a policy rule ID, and/or an application ID.

In some implementations, the processor 11 does not trigger the UE policy configuration request before the transceiver 13 acquires a second indicator from the network node 20, wherein the second indicator allows the UE 10 to trigger the UE policy configuration request. That is, the UE 10 does not trigger the UE policy configuration request before the transceiver 23 transmit, to the UE 10, the second indicator.

In some implementations, the first indicator is included in a registration request message in a registration procedure, such as the registration procedure illustrated in FIGS. 1 to 3. The registration request message is a non-access stratum (NAS) message. The first indicator can also be included in other kinds of NAS messages. The UE assistant information for the UE policy distribution provided by the UE 10 is included in the registration request message in the registration procedure. The UE assistant information for the UE policy distribution includes a UE policy identifier and/or indication (ID), a policy rule ID, and/or an application ID. The network node 20 is a core access and mobility management function (AMF) or policy control function (PCF), such as the AMF 208 and the PCF 204 as illustrated in FIGS. 2 and 3. In some implementations, the UE policy ID includes a supported UE policy ID and/or a stored UE policy ID. In some implementations, the supported UE policy ID may include the stored UE policy ID.

In some implementations, the UE policy ID can be used to indicate and/or identify V2X service, mobile broad band (MBB) service, and/or internet of things (IoT) service, etc. The policy rule ID can characterize a policy of a specific type of service and can be such as an ID with different rules. Multiple rules can be different per UE and service. There can be a rule ID to distinguish the indication. In order to distinguish indications, the application ID can be used to indicate and/or identify different services, such as V2X, IoT, or MBB service.

In some implementations, the processor 21 determines the UE 10 to be allowed to trigger the UE policy configuration request when a UE policy is delivered in one NAS message, there is a parameter in a UE subscription indicating the UE 10 being allowed to trigger the UE policy configuration request, and/or there is a request from a third party allowing the UE 10 to trigger the UE policy configuration request.

In some implementations, a size of the NAS message is acquired from the network node 20. The size of the NAS message is acquired from the AMF during the registration procedure. The UE subscription is acquired from a unified data management (UDM) and/or unified data repository (UDR). The third party is a network exposure function (NEF).

In some implementations, the transceiver 13 is configured to receive a second indicator from the network node 20 to allow the UE 10 to trigger the UE policy configuration request and/or provide the UE assistant information for the UE policy distribution. That is, the transceiver 23 is configured to transmit, to the UE 10, the second indicator to allow the UE 10 to trigger the UE policy configuration request and/or provide the UE assistant information for the UE policy distribution.

In some implementations, the second indicator is included in a registration accept message.

In some implementations, the processor 11 triggers the UE policy configuration request when the transceiver 13 receives the second indicator from the network node 20 to allow the UE 10 to trigger the UE policy configuration request. The processor 11 adds the UE assistant information for the UE policy distribution in a further NAS message towards the network node 20 when the transceiver 13 receives the second indicator from the network node 20 to allow the UE 10 to add the UE assistant information for the UE policy distribution in the further NAS message towards the network node 20.

In some implementations, the processor 11 triggers the UE policy configuration request after the transceiver 13 receives the second indicator from the network node 20 to allow the UE 10 to trigger the UE policy configuration request. The processor 11 adds the UE assistant information for the UE policy distribution in a further NAS message towards the network node 20 after the transceiver 13 receives the second indicator from the network node 20 to allow the UE 10 to add the UE assistant information for the UE policy distribution in the further NAS message towards the network node 20.

In some implementations, the UE 10 triggers the UE policy configuration request when the transceiver 23 transmits, to the UE 10, the second indicator to allow the UE 10 to trigger the UE policy configuration request. The UE 10 adds the UE assistant information for the UE policy distribution in a further NAS message towards the network node 20 when the transceiver 23 transmits, to the UE 10, the second indicator to allow the UE 10 to add the UE assistant information for the UE policy distribution in the further NAS message towards the network node 20.

In some implementations, the UE 10 triggers the UE policy configuration request after the transceiver 23 transmits, to the UE 10, the second indicator to allow the UE 10 to trigger the UE policy configuration request. The UE 10 adds the UE assistant information for the UE policy distribution in a further NAS message towards the network node 20 after the transceiver 23 transmits, to the UE 10, the second indicator to allow the UE 10 to add the UE assistant information for the UE policy distribution in the further NAS message towards the network node 20.

Figure 9:
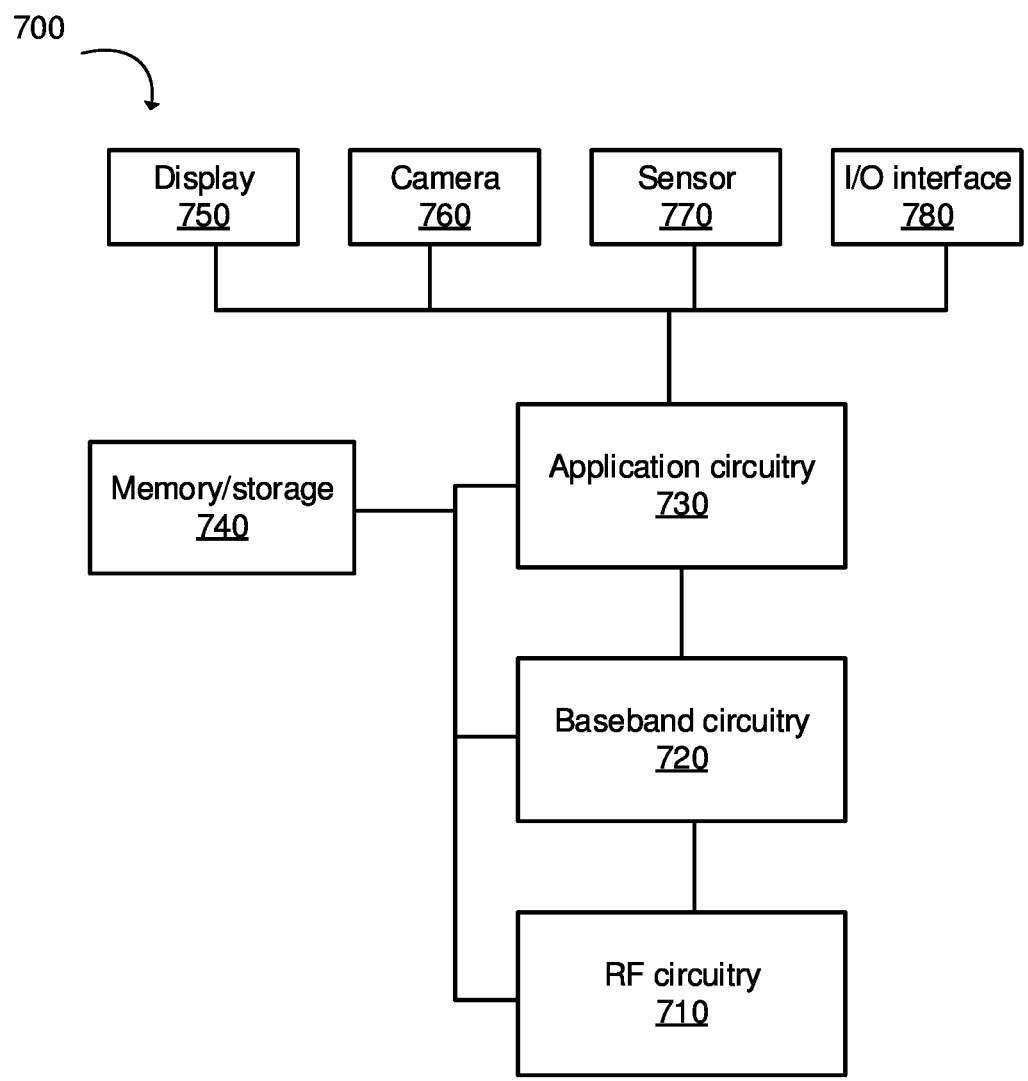
FIG. 9 is a block diagram of a system for wireless communication according to an implementation of the present disclosure.

FIG. 9 is a block diagram of an example system 700 for wireless communication according to an implementation of the present disclosure. Implementations described herein may be implemented into the system using any suitably configured hardware and/or software. FIG. 9 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some implementations, the baseband circuitry may provide for communication compatible with one or more radio technologies. For example, in some implementations, the baseband circuitry may support communication with an evolved universal terrestrial radio access network (EU-TRAN) and/or other wireless metropolitan area networks (WMAN), a wireless local area network (WLAN), a wireless personal area network (WPAN). Implementations in which the baseband circuitry is configured to support radio communications of more than one wireless protocol may be referred to as multi-mode baseband circuitry.

In various implementations, the baseband circuitry 720 may include circuitry to operate with signals that are not strictly considered as being in a baseband frequency. For example, in some implementations, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various implementations, the RF circuitry may include switches, filters, amplifiers, etc. to facilitate the communication with the wireless network.

In various implementations, the RF circuitry 710 may include circuitry to operate with signals that are not strictly considered as being in a radio frequency. For example, in some implementations, RF circuitry may include circuitry to operate with signals having an intermediate frequency, which is between a baseband frequency and a radio frequency.

In various implementations, the transmitter circuitry, control circuitry, or receiver circuitry discussed above with respect to the UE, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some implementations, the electronic device circuitry may be implemented in, or functions associated with the circuitry may be implemented by, one or more software or firmware modules.

In some implementations, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one implementation may include any combination of suitable volatile memory, such as dynamic random access memory (DRAM)), and/or non-volatile memory, such as flash memory.

In various implementations, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various implementations, the sensor 770 may include one or more sensing devices to determine environmental conditions and/or location information related to the system. In some implementations, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various implementations, the display 750 may include a display, such as a liquid crystal display and a touch screen display. In various implementations, the system 700 may be a mobile computing device such as, but not limited to, a laptop computing device, a tablet computing device, a netbook, an ultrabook, a smartphone, etc. In various implementations, system may have more or less components, and/or different architectures. Where appropriate, methods described herein may be implemented as a computer program. The computer program may be stored on a storage medium, such as a non-transitory storage medium.

In the implementation of the present disclosure, a method and an apparatus for negotiation of UE policy delivery between a UE and a network are provided. The implementation of the present disclosure is a combination of techniques/processes that can be adopted in 3GPP specification to create an end product.

A person having ordinary skill in the art understands that each of the units, algorithm, and steps described and disclosed in the implementations of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned implementation since the working processes of the above-mentioned system, device, and unit are basically the same. For easy description and simplicity, these working processes will not be detailed.

It is understood that the disclosed system, device, and method in the implementations of the present disclosure can be realized with other ways. The above-mentioned implementations are examples only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the implementations. Moreover, each of the functional units in each of the implementations can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the implementations of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred implementations, it is understood that the present disclosure is not limited to the disclosed implementations but is intended to cover various arrangements made without departing from the scope of the broadest interpretation of the appended claims.

What is claimed is:

1. A user equipment (UE) for negotiation of UE policy delivery, comprising:
    a memory;
    a transceiver; and
    a processor coupled to the memory and the transceiver, wherein the processor is configured to:
        generate a first capability indicator of the UE, wherein the first capability indicator is associated with UE assistant information for a UE policy distribution, and wherein the UE assistant information for the UE policy distribution comprises one or more UE policy identifiers that are used to indicate one or more sections of a supported UE policy or a stored UE policy in the UE;
        control the transceiver to transmit both the first capability indicator and the UE assistant information for the UE policy distribution in a registration request message in a registration procedure to a policy control function (PCF); and
        control the transceiver to receive a UE policy through a transparent container in NAS transport.

2. The user equipment of claim 1, wherein the UE assistant information for the UE policy distribution further comprises an application ID.

3. The user equipment of claim 1, wherein the UE policy distribution is performed according to the first capability indicator of the UE and the UE assistant information.

4. The user equipment of claim 2, wherein the PCF is configured to deliver, to the transceiver, a policy corresponding to the application ID.

5. The user equipment of claim 4, wherein the application ID is associated with vehicle-to-everything (V2X), and the PCF is configured to deliver, to the transceiver, the policy corresponding to a V2X service.

6. A method for negotiation of user equipment (UE) policy delivery of a user equipment, comprising:
    generating a first capability indicator of the UE, wherein the first capability indicator is associated with UE assistant information for a UE policy distribution, and wherein the UE assistant information for the UE policy distribution comprises a one or more UE policy identifiers that are used to indicate one or more sections of a supported UE policy or a stored UE policy in the UE;
    transmitting both the first capability indicator and the UE assistant information for the UE policy distribution in a registration request message in a registration procedure to a policy control function (PCF); and
    receiving a UE policy through a transparent container in NAS transport.

7. The method of claim 6, wherein the UE assistant information for the UE policy distribution further comprises an application ID.

8. The method of claim 6, wherein the UE policy distribution is performed according to the first capability indicator of the UE and the UE assistant information.

9. The method of claim 7, wherein the method comprises delivering, to the user equipment, a policy corresponding to the application ID.

10. The method of claim 9, wherein the application ID is associated with vehicle-to-everything (V2X), and the method comprises delivering, to the user equipment, the policy corresponding to a V2X service.

11. A policy control function (PCF) for negotiation of user equipment (UE) policy delivery, comprising:
a memory;
a transceiver; and
a processor coupled to the memory and the transceiver, wherein the processor is configured to:
control the transceiver to receive a first capability indicator of a UE and UE assistant information for a UE policy distribution in a registration request message in a registration procedure of the UE, wherein the first capability indicator is associated with the UE assistant information for the UE policy distribution, and wherein the UE assistant information for the UE policy distribution comprises one or more UE policy identifiers that are used to indicate one or more sections of a supported UE policy or a stored UE policy in the UE; and
control the transceiver to transmit a UE policy through a transparent container in NAS transport.

12. The PCF of claim 11, wherein the UE assistant information for the UE policy distribution further comprises an application ID.

13. The user equipment of claim 1, wherein the first capability indicator of the UE is related to the UE triggering a UE policy configuration.

14. The method of claim 6, wherein the first capability indicator of the UE is related to the UE triggering a UE policy configuration.

15. The PCF of claim 11, wherein the first capability indicator of the UE is related to the UE triggering a UE policy configuration.

* * * * *